US011520934B2

(12) United States Patent
Cai et al.

(10) Patent No.: US 11,520,934 B2
(45) Date of Patent: Dec. 6, 2022

(54) METHOD FOR PREVENTING DIFFERENTIAL CRYPTANALYSIS ATTACK

(71) Applicants: Nanjing University Of Posts And Telecommunications, Jiangsu (CN); NANTONG INSTITUTE OF NANJING UNIVERSITY OF POSTS AND TELECOMMUNICATIONS CO., LTD., Jiangsu (CN)

(72) Inventors: Zhikuang Cai, Jiangsu (CN); Xun Xu, Jiangsu (CN); Ming Wang, Jiangsu (CN); Zixuan Wang, Jiangsu (CN); Henglu Wang, Jiangsu (CN); Jingqi Yao, Jiangsu (CN); Jiafei Yao, Jiangsu (CN); Yufeng Guo, Jiangsu (CN)

(73) Assignees: Nanjing University Of Posts And Telecommunications, Jiangsu (CN); NANTONG INSTITUTE OF NANJING UNIVERSITY OF POSTS AND TELECOMMUNICATIONS CO., LTD., Jiangsu (CN)

( * ) Notice: Subject to any disclaimer, the term of this patent is extended or adjusted under 35 U.S.C. 154(b) by 0 days.

(21) Appl. No.: 17/614,334

(22) PCT Filed: Mar. 12, 2021

(86) PCT No.: PCT/CN2021/080486
§ 371 (c)(1),
(2) Date: Nov. 25, 2021

(87) PCT Pub. No.: WO2022/088584
PCT Pub. Date: May 5, 2022

(65) Prior Publication Data
US 2022/0300662 A1   Sep. 22, 2022

(30) Foreign Application Priority Data

Oct. 28, 2020 (CN) .......................... 202011171755.X

(51) Int. Cl.
*H04L 29/06* (2006.01)
*G06F 21/75* (2013.01)

(52) U.S. Cl.
CPC .................................. *G06F 21/75* (2013.01)

(58) Field of Classification Search
CPC .......................... G06F 21/75; G06F 2221/0704
See application file for complete search history.

(56) References Cited

U.S. PATENT DOCUMENTS 6,018,815 A     1/2000  Baeg
8,904,181 B1 *  12/2014 Felsher .................. H04L 9/321
                                                              380/282

(Continued)

FOREIGN PATENT DOCUMENTS

CN     103997402     8/2014
CN     106646203     5/2017

(Continued)

OTHER PUBLICATIONS

"International Search Report (Form PCT/ISA/210) of PCT/CN2021/080486" dated Jul. 15, 2021, pp. 1-4.

(Continued)

*Primary Examiner* — Wasika Nipa
(74) *Attorney, Agent, or Firm* — JCIP Global Inc.

(57) ABSTRACT

A method for preventing a differential cryptanalysis attack is provided. The method is implemented by an adaptive scan chain, a control module, and a plaintext analysis module. The plaintext analysis module controls the adaptive scan chain, so that two plaintexts differing in the last bit of only one byte are input through scan chains with different structures. Consequently, the two input plaintexts for which differential cryptanalysis attack technology originally can be used to crack the key are unable to generate outputs that can be used by the differential cryptanalysis attack technology.

3 Claims, 9 Drawing Sheets

(56) References Cited

U.S. PATENT DOCUMENTS

2010/0242028 A1* 9/2010 Weigert ............... G06F 21/105
                                                    717/131
2015/0199410 A1* 7/2015 Redlich .................. G06F 16/26
                                                    707/754

FOREIGN PATENT DOCUMENTS

| CN | 107703442 | 2/2018 |
| CN | 112000996 | 11/2020 |

OTHER PUBLICATIONS

"Written Opinion of the International Searching Authority (Form PCT/ISA/237) of PCT/CN2021/080486," dated Jul. 15, 2021, pp. 1-4.

* cited by examiner

METHOD FOR PREVENTING DIFFERENTIAL CRYPTANALYSIS ATTACK

CROSS-REFERENCE TO RELATED APPLICATION

This application is a 371 of international application of PCT application serial no. PCT/CN2021/080486, filed on Mar. 12, 2021, which claims the priority benefit of China application no. 202011171755.X, filed on Oct. 28, 2020. The entirety of each of the above mentioned patent applications is hereby incorporated by reference herein and made a part of this specification.

TECHNICAL FIELD

The present disclosure relates to the field of hardware security, and more particularly, to a method for preventing a differential cryptanalysis attack for a test of an Advanced Encryption Standard (AES) circuit.

BACKGROUND

The information network brings great convenience to people's life and production with its wide interconnection characteristics, which, however, also causes information security issues while promoting the rapid development of modern society. Based on the above considerations, scholars have proposed the concept of "security chip", which has the principle of adding an encrypted circuit on the periphery of an ordinary chip. Such an encrypted circuit can be realized by using encryption algorithms such as Data Encryption Standard (DES), AES, and RSA. Speaking of testing issues, it is necessary to mention DFT technology, which aims to detect failures introduced in a chip manufacturing process and has the following implementation principle: converting a chip with mixed timing and combinational logic into a pure combinational logic circuit by inserting scan chain technology, and then performing shift and capture operations on the scan chain to obtain a response from the internal combinational logic of the chip; and comparing this response with a response vector generated by the Automatic Test Pattern Generation (ATPG) to determine whether the chip has a failure in the manufacturing process. With the improvement of the process, the occurrence probability of failure in production increasingly grows. Therefore, the DFT technology has been widely applied. Just due to the introduction of the DFT technology, an attacker can use the scan chain to acquire information which is stored on the chip and has not been fully encrypted. The analysis on the information which has not been fully encrypted greatly threatens the security of the encryption chip, and a widely used attack technique is a differential cryptanalysis attack. Such an attack manner probably derives an encryption key, so that the attacker gets the unencrypted sensitive information, greatly threatening the security of the encryption chip and causing leakage of personal privacy information.

SUMMARY

The present disclosure aims to provide a method for preventing a differential cryptanalysis attack, which protects an AES circuit by analysis on input plaintexts. If it is detected that a chip switches to a test mode after being reset, this action is recorded by a control module. An output signal from this module determines whether to start a plaintext analysis module. Once started, the plaintext analysis module starts analyzing the plaintexts input to the chip. If a law between the input plaintexts is similar to a plaintext law for differential cryptanalysis, the structure of a scan chain in the chip is changed. Without knowing that the structure of the scan chain has been changed, an attacker may be deceived by this structure. However, information that is not fully encrypted may still be output even though the structure of the scan chain has been changed, only that this information is more complex than the output before changing the structure of the scan chain. Once such a more complex structure is acquired by the attacker, the chip is also unsafe. Based on this case, a structure of an adaptive scan chain is introduced. The adaptive scan chain can change into a common scan chain or a complex scan chain. Therefore, if the plaintext analysis module regards that the currently input plaintext has a risk of leaking key information, the plaintext is allowed to go through the complex scan chain, thus greatly improving the chip security.

A method for preventing a differential cryptanalysis attack is provided, which is implemented by means of an adaptive scan chain, a control module, and a plaintext analysis module;

the adaptive scan chain changes in structure according to a signal output by the plaintext analysis module; when an output value from the plaintext analysis module is 0, the scan chain is a common scan chain; and when the output value from the plaintext analysis module is 1, the scan chain is a complex scan chain;

the control module controls the plaintext analysis module to work only in a test mode;

the plaintext analysis module is determined by the control module to work or not; and in a process of each round of plaintext analysis by the plaintext analysis module, once it is detected that a currently input plaintext and a previously input plaintext differ in the last bit of only one byte, the plaintext analysis module changes the output value to change the structure of the adaptive scan chain; and the method includes the following steps:

step 1: detecting, by the control module, whether a chip switches to a test mode after being reset, and recording such a switch action, to determine whether to start the plaintext analysis module;

step 2: starting the plaintext analysis module, analyzing the plaintexts input to the chip, and changing the structure of a scan chain the currently input plaintext is about to go through if the currently input plaintext and the previously input plaintext meet a plaintext law for differential cryptanalysis; and step 3: because the adaptive scan chain can change into a common scan chain or a complex scan chain, if the plaintext analysis module regards that the currently input plaintext has a risk of leaking key information, allowing the plaintext to go through the complex scan chain; and if there is no risk after analysis, allowing the plaintext to go through the common scan chain.

Further, the structure of the adaptive scan chain is controlled by a selector which receives the output value from the plaintext analysis module; when a select signal is 0, the original scan chain remains unchanged; and when the select signal is 1, the structure of the scan chain is changed.

Further, the control module determines whether the chip makes an action scan_en=1 of entering a test mode after being reset, and records the action as long as it happens; and in a specific implementation, once it is detected that the scan_mode signal is enabled, an output signal from this module is pulled up and then the plaintext analysis module can start working.

Further, the plaintext analysis module is enabled only in a test mode and stops working only when the chip is powered down.

The present disclosure has the following advantageous effects: (1) The plaintext analysis module controls the adaptive scan chain, so that two plaintexts differing in the last bit of only one byte are input through scan chains with different structures. Consequently, the two input plaintexts for which differential cryptanalysis attack technology originally can be used to crack the key are unable to generate outputs that can be used by the differential cryptanalysis attack technology. (2) Compared to the complex scan chain, the present disclosure can confuse an attacker who uses the differential cryptanalysis attack to a certain extent. Because the plaintext pairs for which the key can be recovered have gone through the scan chains with different structures, when the XOR operation is performed on all values obtained after the first round of encryption, the number of "1s" in the result probably misleads the attacker into recovering a wrong key. Through experimental analysis, it is proved that the plaintext analysis technology based on the structure of the adaptive scan chain is greatly improved in security.

DETAILED DESCRIPTION OF THE EMBODIMENTS

The technical solution of the present disclosure is further described in detail below with reference to the accompanying drawings of the specification.

This embodiment makes improvements to solve the problem that it is difficult to protect an encryption chip against a differential cryptanalysis attack, and innovatively implement an effective method for preventing the differential cryptanalysis attack by means of plaintext analysis.

Figure 1:
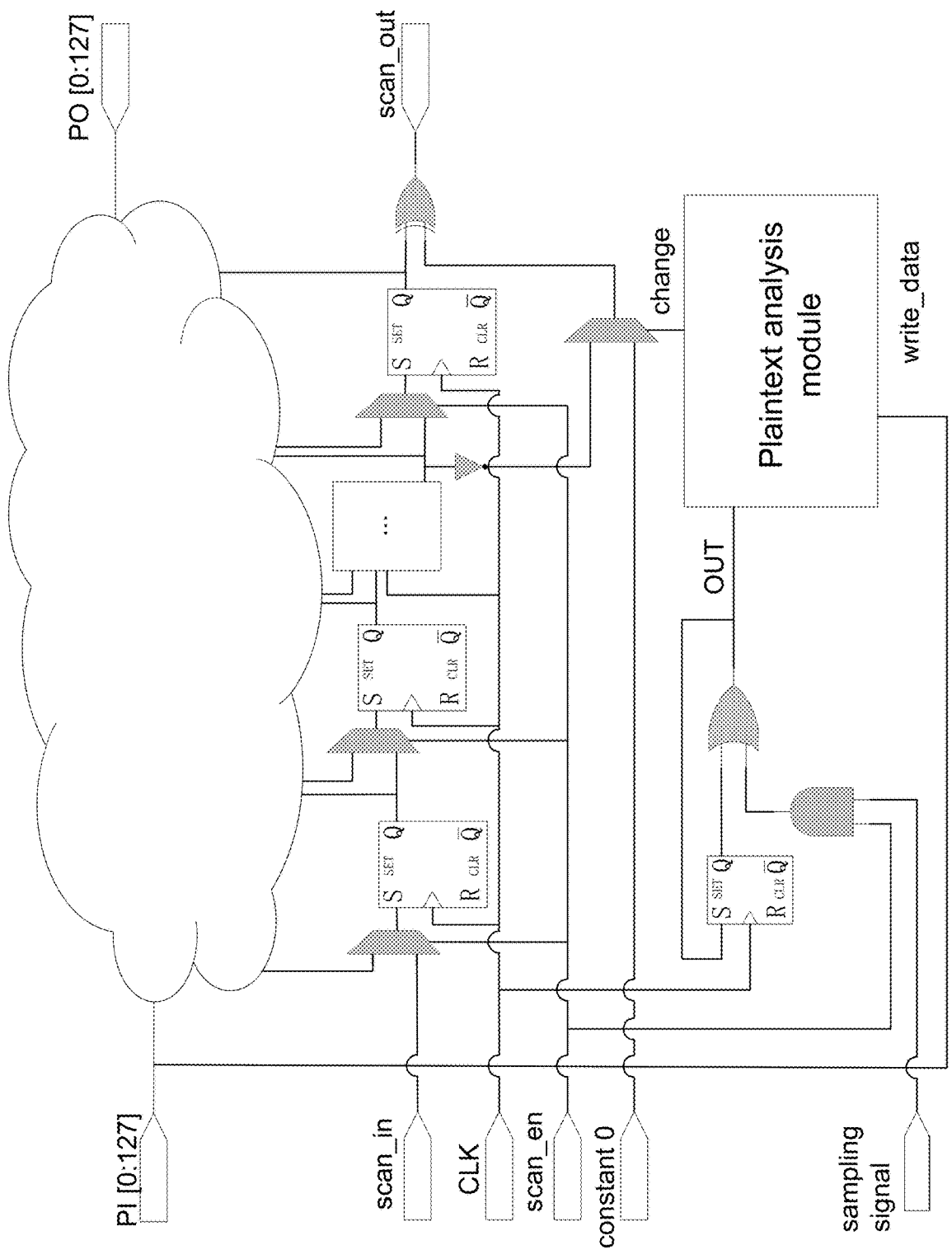
FIG. 1 is an overall block diagram in an embodiment of the present disclosure.

In order to prevent a differential cryptanalysis attack, a plaintext analysis module is provided. When a chip runs only in a functional mode, the plaintext analysis module does not work, to prevent production of additional power consumption. Once it is detected that the chip enters a test mode, there is a threat of key information leakage. In this case, the plaintext analysis module starts working. Three modules provided by this embodiment all use Verilog code for modeling and pass the yes verification, and an overall block diagram of the design is shown in FIG. 1. Moreover, two plaintexts that differ in the last bit of only one byte are allowed to go through different scan chains, thus improving the chip security.

(1) Introduction of the Differential Cryptanalysis Attack

To realize the differential cryptanalysis attack, first, it is required to determine the structure of a scan chain, and then to change one bit in a 128 bit plaintext each time. When the pair of plaintexts are sent to the scan chain, a pair of output results after the first round of AES encryption can be obtained. Through a large number of the above experiments, the XOR operation is performed between the foregoing results and the occurrence frequency of "1" in the results is counted. If the frequency is 1, this result can uniquely determine the value when the plaintext completes only the initial round. Because the plaintext is known, the key can then be acquired by an attacker.

Figure 2:
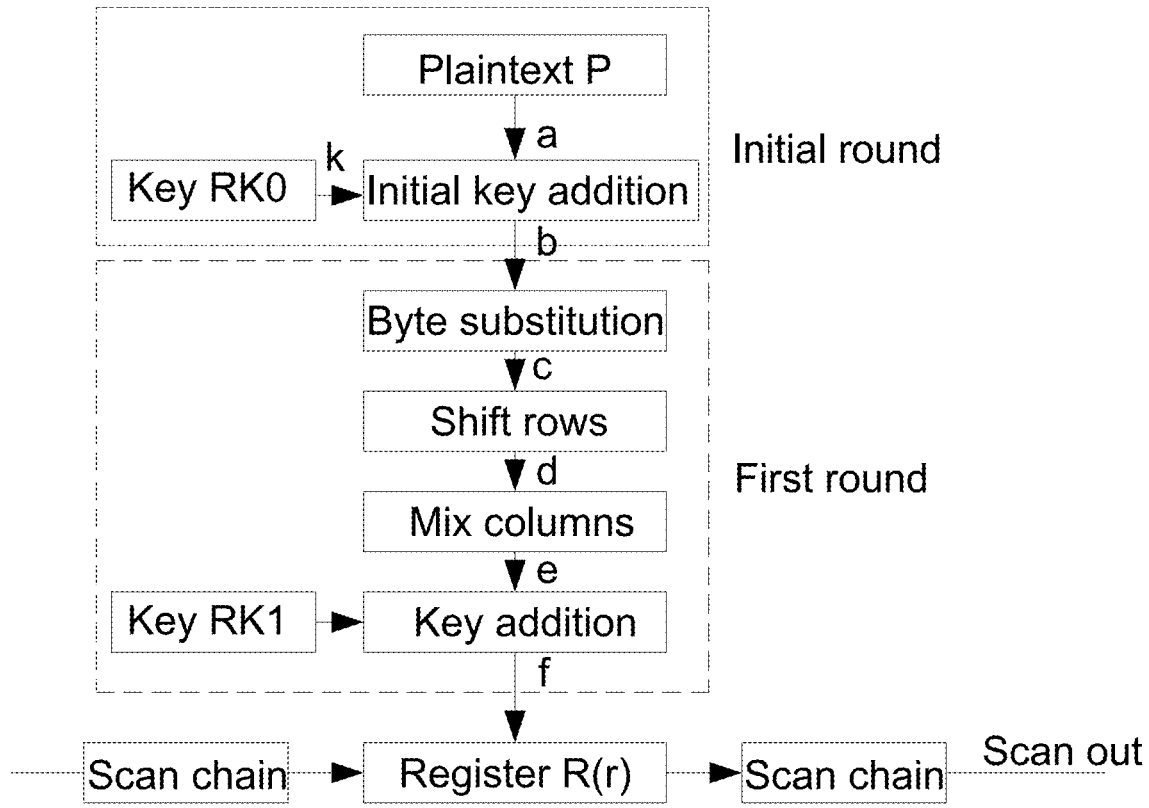
FIG. 2 shows an initial round and a first round of AES encryption in the embodiment of the present disclosure.

As shown in FIG. 2, assuming that two different plaintext bytes $a_{1,1}^1$ and $a_{1,1}^2$ are input, $b_{1,1}^1$ and $b_{1,1}^2$ are obtained after the initial-round operation (initial key addition). After the operation of $f^1 \oplus f^2$, the number of data bits "1" in the obtained result is 9, 12, 23, or 24. Therefore, the number of data bits "1" in the operation of $f^1 \oplus f^2$ is determined according to $b_{1,1}^1$, as shown in the following table. For example, if the number of the data bits "1" in the result of the operation of $f^1 \oplus f^2$ is 9, the values of $b_{1,1}^1$ and $b_{1,1}^2$ are $(b_{1,1}^1, b_{1,1}^2)=(226, 227)$ or $(227, 226)$. Because the plaintext bytes $a_{1,1}^1$ and $a_{1,1}^2$ corresponding to $f^1$ and $f^2$ are known, $RK0 = a \oplus b$ can be obtained according to the formula $b = a \oplus RK0$, and thus the key can be recovered.

| Number of "1s" | 9 | 12 | 23 | 24 |
|---|---|---|---|---|
| $(b_{1,1}^1, b_{1,1}^2)$ | 226, 227 | 242, 243 | 122, 123 | 130, 131 |

Through the foregoing analysis, it can be seen that the key RK0 is derived by acquiring the values of the encrypted byte pairs $(b_{1,1}^1, b_{1,1}^2)$. When all the encrypted byte pairs $(b_{1,1}^1, b_{1,1}^2)$ which can be used to derive the key RK0 are converted to binary values, it is found that the encrypted byte pairs $(b_{1,1}^1, b_{1,1}^2)$ meet the feature that a value difference is 1 and only the last bits are different. Because $b = a \oplus RK0$ holds true, $a = b \oplus RK0$ also holds true. Therefore, the plaintext byte pairs $(a_{1,1}^1, a_{1,1}^2)$ which can be used to recover the key also meet the feature that a value difference is 1 and only the last bits are different.

A plaintext analysis attack needs to meet the following two conditions:

the input plaintexts differ in the last bit of one byte by 1; and it is required to frequently switch between a test mode and a functional mode in the attack phase.

For the foregoing first condition of the differential cryptanalysis attack, a plaintext analysis module is provided. It can be noted that, the plaintext byte pairs $(a_{1,1}^1, a_{1,1}^2)$ which can be used to recover the key belongs to a subset of a set in which the last bits have a difference of 1. Therefore, the case that the last bits of one byte have a difference of 1 is selected as a screening condition of the plaintext analysis module and also as a judgment condition for the plaintext pairs that can be used to recover the key. According to the second condition of the differential cryptanalysis attack, a control module is provided. As long as a test enable signal is detected, the control module outputs a signal for starting the plaintext analysis module, and controls a structure of an adaptive scan chain in cooperation with the plaintext analysis module. When the plaintext analysis module detects that the previously input plaintext and the currently input plaintext differ in the last bit of one byte, the structure of the scan chain is changed, and then the plaintext pairs that can be used to recover the key go through scan chains with different structures. Thus, the XOR results of the outputs $f^1$ and $f^2$ cannot be used to recover the key RK0.

(2) Structural Design of the Adaptive Scan Chain

Figure 3:
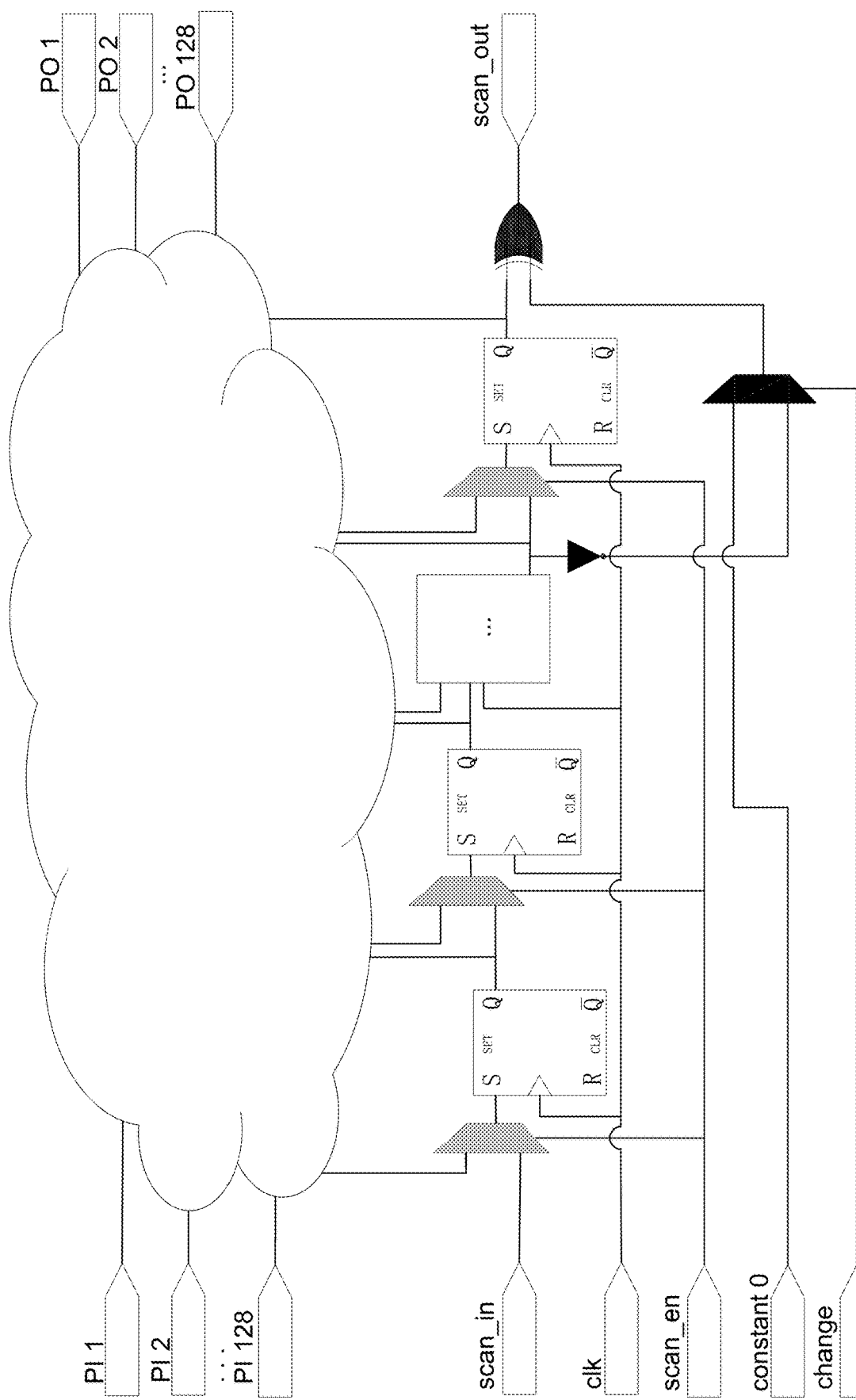
FIG. 3 is a structural diagram of an adaptive scan chain in the embodiment of the present disclosure.
Figure 6:
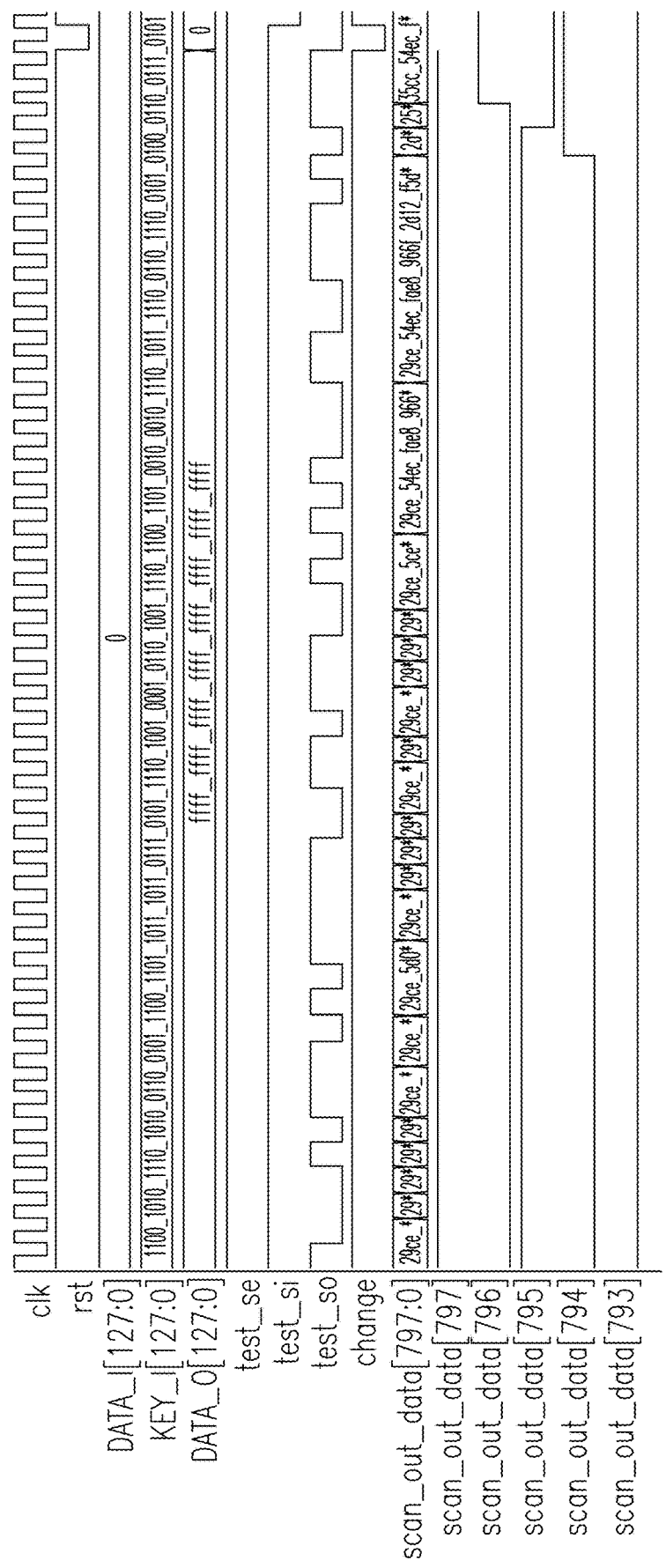
FIG. 6 shows a simulation waveform of the adaptive scan chain in the embodiment of the present disclosure.

FIG. 3 is a structural diagram of the adaptive scan chain. An inverter is connected from an SI terminal of the last scan register, an output terminal of the inverter is connected to an input of an MUX, and an output of the MUX is connected to one of the inputs of the XOR gate, where the MUX is controlled by a change signal output by the plaintext analysis module. It can be seen from FIG. 3 that, when the change signal is "0", the output from the MUX is constantly "0". In the two inputs of the XOR gate, one is the output from a common scan chain and the other one is the output "0" from the MUX. In this case, an output of the scan_out signal is a value of the common scan chain, which indicates that the current scan chain is a common scan chain. When the plaintext analysis module detects that the input plaintext meets the characteristics of differential cryptanalysis, that is, when the change signal is "1", one of the inputs of XOR gate is still the output from a common scan chain, but the other one changes into a negated value of a value in the penultimate register of the scan chain after passing through the NOT gate. In this case, the structure of the scan chain has been changed. However, the attacker may not be aware of the fact that the scan chain has been changed, because the scan chain is still able to perform input and output operations normally. In case the attacker knows the scan chain of which the structure has been changed, he/she cannot determine whether the structure of the scan chain is unchanged or changed at this time, thus failing to acquire key information. FIG. 6 shows a simulation waveform of an adaptive scan chain, where the change signal controls the change in the structure of the scan chain. When the change signal is "0", scan_out_data is the output of the input plaintext data_in after going through the common scan chain; and when the change signal is "1", the structure of the scan chain changes into a complex scan chain structure.

(3) Circuit Design of the Control Module

Figure 4:
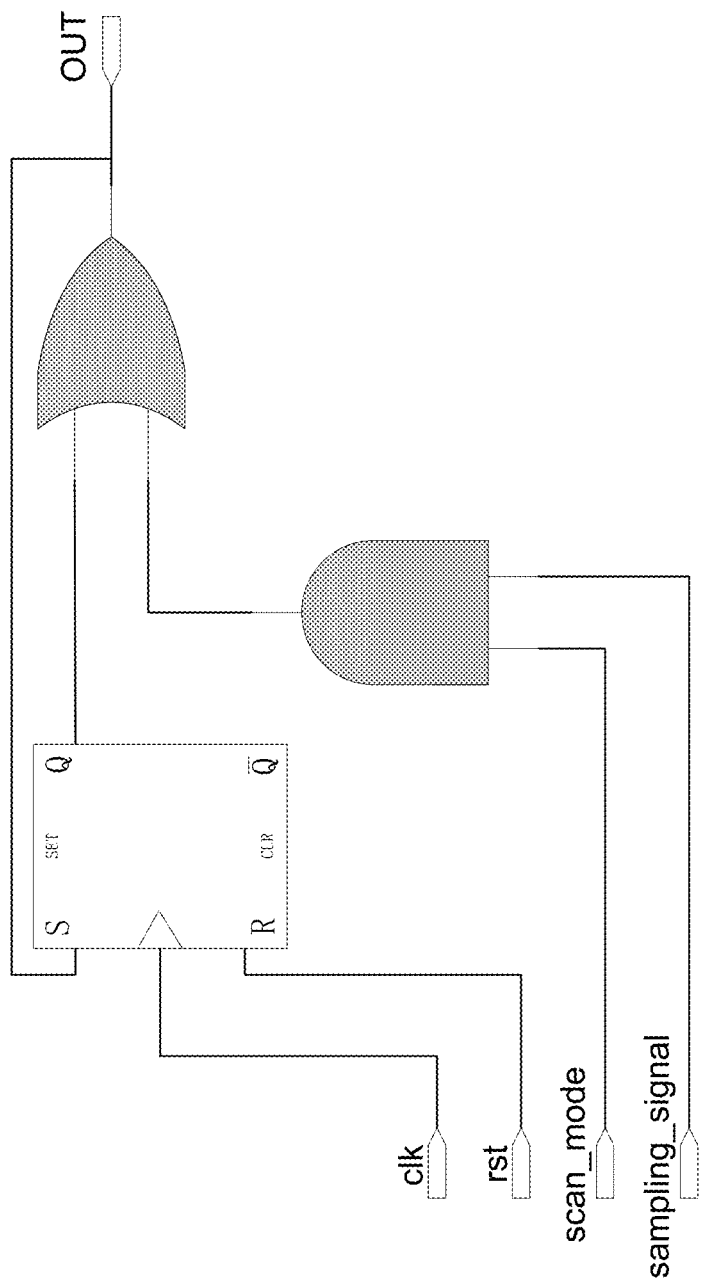
FIG. 4 is a circuit diagram of a control module in the embodiment of the present disclosure.
Figure 7:
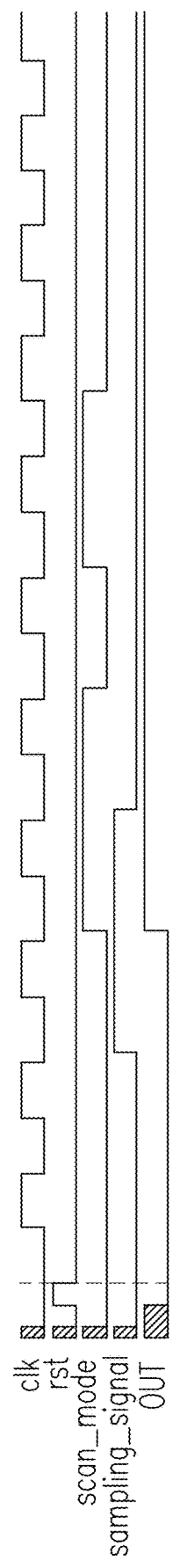
FIG. 7 shows a simulation waveform of the control module in the embodiment of the present disclosure.

FIG. 4 is a diagram of a control module. The sampling signal is constantly 1 after the chip is reset. Once it is detected that scan_mode is "1", the AND gate outputs "1" and the OR gate also outputs "1", and the "1" output by the OR gate is returned to the input of the register. Therefore, the output from this module is always "1". In other words, once the action of the scan_mode signal changing into "1" is detected, the module constantly outputs "1", which is irrelevant to the subsequent change of the scan_mode signal. The output from this module is used to control the plaintext analysis module to work or not, where the register is the key to keep the output constant at "1". FIG. 7 shows a simulation waveform of the control module. The control module functions to output a signal OUT to make the plaintext analysis module start working, when the test mode signal scan_mode changes into "1". The sampling signal is a sampling signal of the scan_mode signal, and is constantly "1" after the chip is enabled.

(4) Design of the Plaintext Analysis Module

Figure 5:
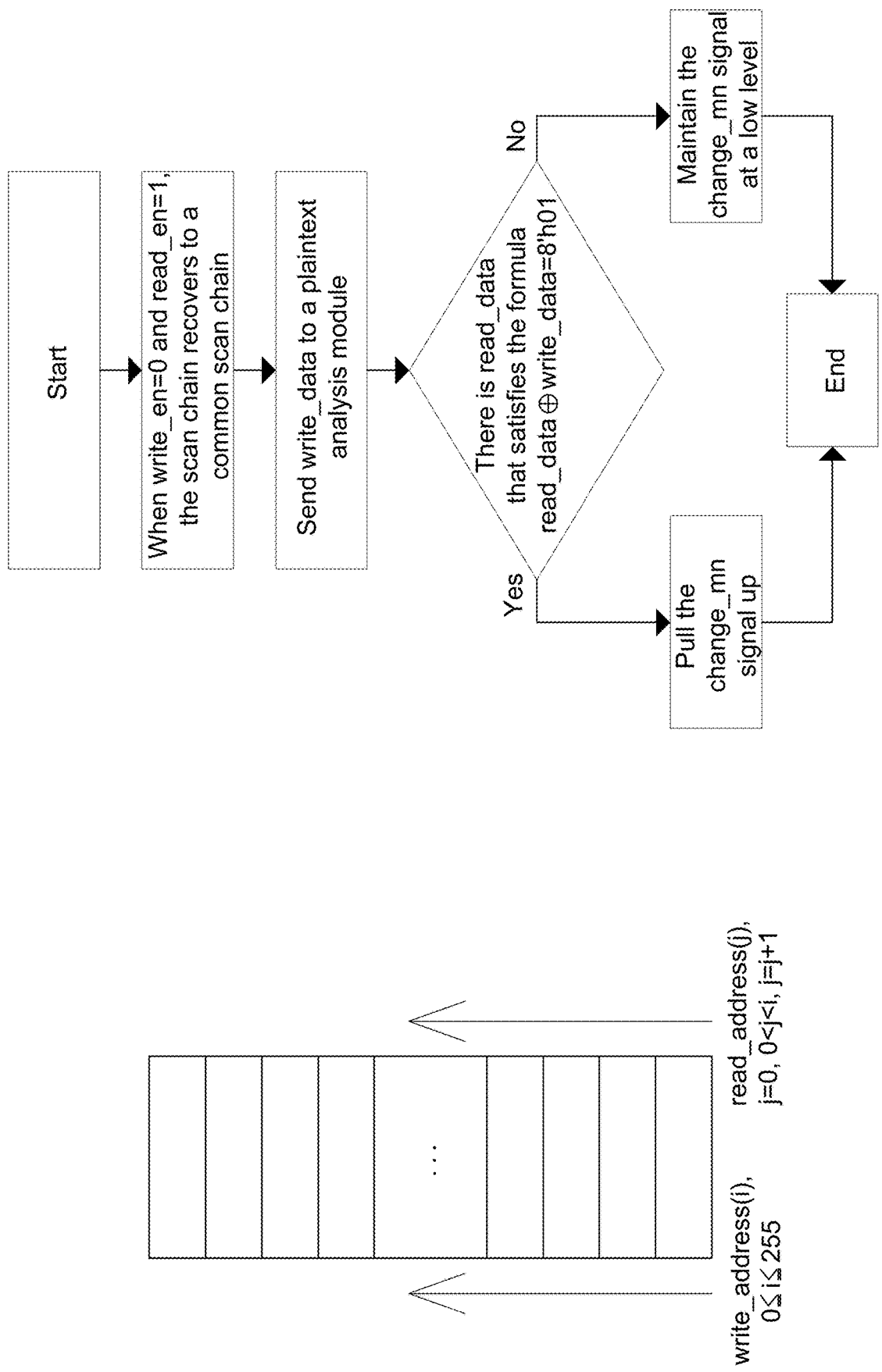
FIG. 5 is a schematic process diagram of each round of plaintext analysis in the embodiment of the present disclosure.

FIG. 5 is a flowchart of each round of plaintext analysis in the plaintext analysis module. The plaintext analysis module is enabled by a signal output from a starting module, and internally has sixteen memory blocks each of 8*256, which are used to write in plaintexts that need to be currently input to the scan chain. In each round of plaintext analysis, it is required to read (referred to as read_data) the previously input plaintext from the memory blocks, so as to make analysis and comparison with the plaintext to be currently written in. According to the following table, because the 128 bit plaintext is composed of 16 bytes and each byte has 8 bits, the maximum address of each memory block is set to 255 and each address stores 8 bit plaintext.

| Decimal | Binary |
| --- | --- |
| 226 | 11100010 |
| 227 | 11100011 |
| 242 | 11110010 |
| 243 | 11110011 |
| 122 | 01111010 |
| 123 | 01111011 |
| 130 | 10000010 |
| 131 | 10000011 |

Figure 8:
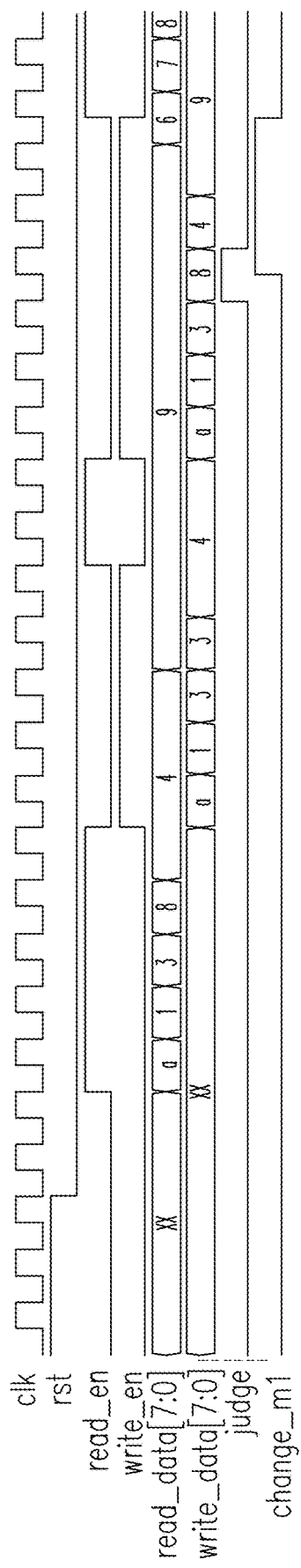
FIG. 8 shows a simulation waveform of a plaintext analysis module in the embodiment of the present disclosure.
Figure 9:
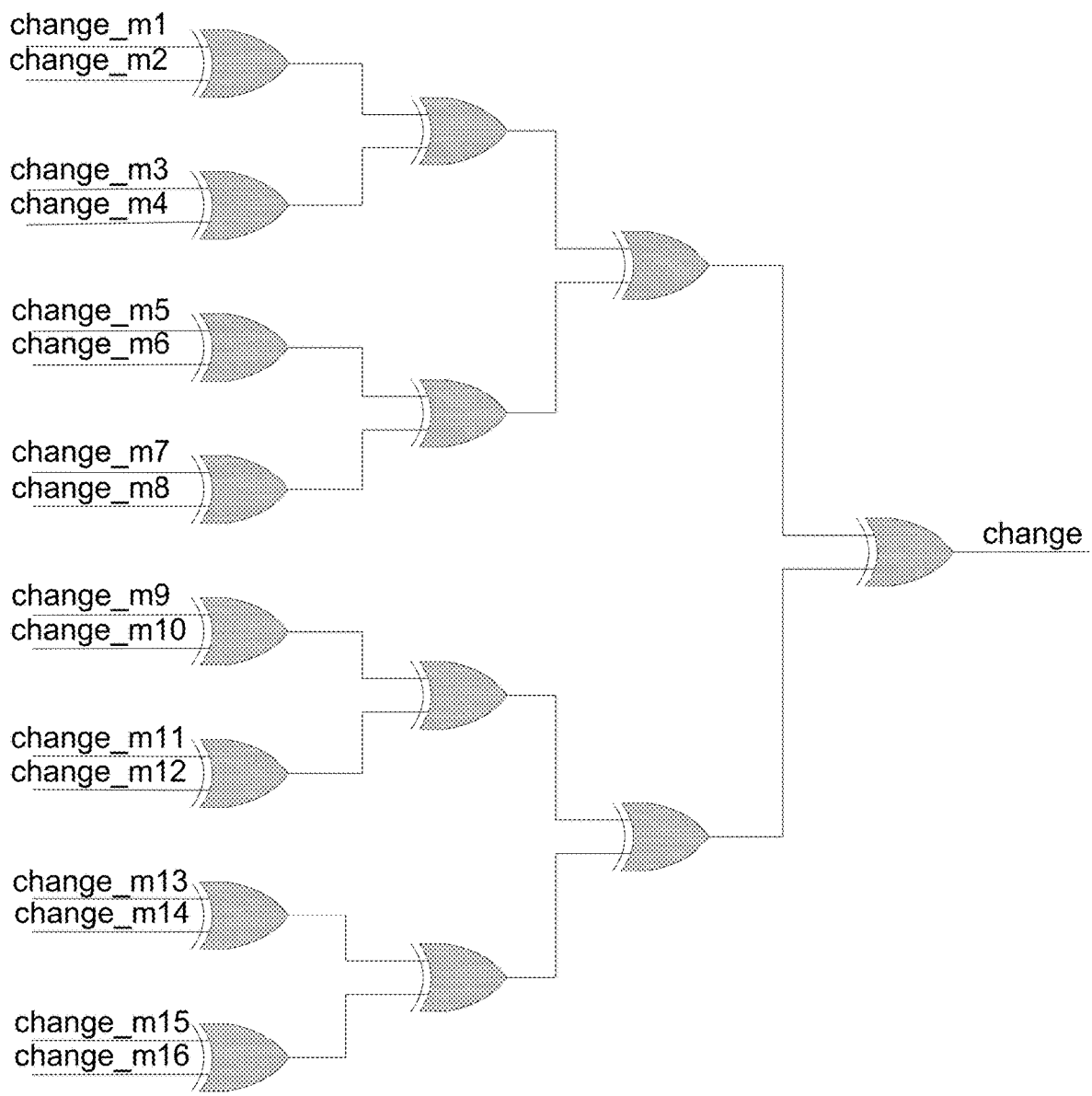
FIG. 9 shows an XORs gate circuit in the embodiment of the present disclosure.

In a process of each round of plaintext analysis, the address of write_data is i, where i∈[0,255]; and the address of read_data is j, where j∈[0,i). When write en=0 and read en=1, each round of plaintext analysis starts, and the address of read_data increases from 0, until all the input plaintext bytes previously stored in the memory blocks are traversed. The judgment formula of the plaintext analysis is read_data⊕write_data=8'h01. If read_data satisfies this formula, it indicates that the previously input plaintext byte and the current plaintext byte differ in the last bit, and the plaintext analysis module outputs a signal to trigger a change in the structure of the adaptive scan chain. If read_data does not satisfy this formula, the signal output from the plaintext analysis module stays at a low level and the scan chain is a common scan chain. FIG. 8 shows a simulation waveform of the plaintext analysis module. When write_en=0 and read_en=1, it indicates that a new round of plaintext analysis starts. FIG. 8 shows two rounds of plaintext analysis in which write_data is 4 and 9 respectively. The write_data signal represents plaintext bytes currently written into the scan chain and the memory blocks of the plaintext analysis module, and read_data means traversing all the values of write_data before the current round of plaintext analysis starts. In this case, the plaintext analysis module determines whether the formula read_data⊕write_data=8'h01 holds true, and if it holds true, the judge signal changes into 1. In the process of each round of plaintext analysis, as long as it is detected that the judge signal changes into "1", it indicates that there must be read_data which satisfies the formula read_data⊕write_data=8'h01, and change_mn (which is change_m1 in FIG. 8) signal is pulled up. However, at the end of each round of plaintext analysis, that is, when write_en=1 and read_en=0, the change_mn signal is reset to "0". In the whole plaintext analysis module, each time the judge signal is pulled up, it indicates that there is a case where the currently input plaintext byte and the previous plaintext byte differ in the last bit in the current round of plaintext analysis. Then, the plaintext analysis module enables one change in the change_mn (0<n<17) signal, while the change_mn signals in all the sixteen memory blocks finally pass through the XORs gate structure (as shown in FIG. 9), thus controlling the final change in the change signal and causing the change in the structure of the adaptive scan chain.

(5) Security Analysis

For the differential cryptanalysis attack, security analysis is performed to determine whether the analysis method for the input plaintext can provide effective protection. The security analysis of the present disclosure is based on the difficulty in implementing a differential cryptanalysis attack to acquire sensitive information. There are two difficulties in using the differential cryptanalysis attack to acquire sensitive information:

1) Difficulty in Determining the Position of an Intermediate Value Register R in the Scan Chain To determine the position of the intermediate value register, it is required to input two plaintexts with a bit difference of "1". On the premise that the structure of the adaptive scan chain is not introduced, a 1-bit change in the plaintext may cause changes of multiple specific bits of an intermediate value, and these changes can be correctly communicated out of the scan chain. Thus, the attacker can determine the position of the intermediate value register in the scan chain. After the adaptive scan chain is introduced, the attacker inputs a plaintext that differs by only one bit from the first plaintext. When there is only 1 bit difference between the two plaintexts and the probability of the bits with a difference of 1 occurring in the last bit of one byte of the plaintext is $16/128$, the plaintext analysis module changes the structure of the scan chain. In this case, the change bit of the output of the scan chain is independent of the position of the intermediate value register (due to XOR). However, the structure of the scan chain is changed if the plaintexts differ in the last bit of one byte by 1, which probably causes exposure of the structure of the adaptive scan chain in the attack phase. Therefore, without exposing that the structure of the adaptive scan chain can be changed, the attacker has a high probability of determining the position of the intermediate value register, and such a probability is $7/8$, thus deducing that the probability of the attacker knowing that the structure of the scan chain can be changed is $1/8$ in this phase. If the attacker needs to make k attacks in this phase, then the probability of the attacker correctly determining the position of the intermediate value register is $$\left(\frac{7}{8}\right)^k.$$

2) Difficulty in Recovering the Key According to a Value of the Intermediate Value Register R Because of the introduction of the adaptive scan chain, it is difficult for the attacker to recover the correct key RK0 without knowing that the scan chain can be changed. The following discusses the probability of the attacker successfully recovering the key RK0 when knowing that the scan chain can be changed but not knowing a specific circuit structure of the changed scan chain. According to the obtained characteristics of the plaintext pairs which can be used to recover the key, it is assumed that (2t, 2t+1) are the plaintext byte pairs which can be used to recover the key. In the first step, the attacker sends a plaintext byte 2t to the scan chain in a scan test mode, and the plaintext analysis module synchronously sends the plaintext byte 2t to the plaintext analysis module. Because the formula read_data⊕write_data=8'h01 is not met, the signal output by the plaintext analysis module does not change the structure of the scan chain in this case, and the scan chain is a common scan chain. In the second step, the attacker sends a plaintext byte 2t+1 to the scan chain in a scan test mode. Because the formula read_data⊕write_data=8'h01 is met, the signal output by the plaintext analysis module changes the structure of the scan chain in this case, and the scan chain changes into a complex scan chain. Through the foregoing two steps, the plaintext byte pairs (2t, 2t+1) that can be used to recover the key go through scan chains with different structures, and the key cannot be recovered. The foregoing two difficulties greatly increase because the plaintext analysis module triggers introduction of the register structure of the adaptive scan chain. Even when the attacker can determine the position of the intermediate value register in the first step, the attacker still needs to use differential cryptanalysis to make an attack in the second attack step. However, the adaptive scan chain can lead the plaintext pairs which can be used to recover the key into different scan chains, so that the attacker cannot recover the key RK0.

The above merely describes a preferred embodiment of the present disclosure, but the protection scope of the present disclosure is not limited to the foregoing embodiment. All equivalent modifications or changes made by those of ordinary skill in the art based on the disclosed content of the present disclosure shall be included in the protection scope set forth in the claims.

What is claimed is:

1. A method for preventing a differential cryptanalysis attack, wherein the method is implemented by an adaptive scan chain, a control module, and a plaintext analysis module;

the adaptive scan chain changes in structure according to a signal output by the plaintext analysis module; when an output value from the plaintext analysis module is 0, the adaptive scan chain is a common scan chain; and when the output value from the plaintext analysis module is 1, the adaptive scan chain is a complex scan chain;

the control module controls the plaintext analysis module to work only in a test mode; and the plaintext analysis module is determined by the control module to work or not, and in a process of each round of plaintext analysis by the plaintext analysis module, once it is detected that input plaintexts differ in the last bit of only one byte, the output value is changed to change the structure of the adaptive scan chain;

and the method comprises the following steps:

step 1: detecting, by the control module, whether a chip switches to the test mode after being reset, and recording such a switch action, to determine whether to start the plaintext analysis module;

step 2: starting the plaintext analysis module, analyzing the plaintexts input to the chip, and changing the structure of a scan chain a currently input plaintext is about to go through if the currently input plaintext and a previously input plaintext meet a plaintext law for differential cryptanalysis; and step 3: because the adaptive scan chain is able to change into a common scan chain or a complex scan chain, if the plaintext analysis module regards that the currently input plaintext has a risk of leaking key information, allowing the currently input plaintext to go through the complex scan chain; and if there is no risk after analysis, allowing the currently input plaintext to go through the common scan chain, wherein the control module determines whether the chip makes an action scan en=1 of entering the test mode after being reset, and records the action as long as it happens; and in a specific implementation, once it is detected that a scan mode signal is enabled, an output signal from this module is pulled up and then the plaintext analysis module is able to start working.

2. The method for preventing a differential cryptanalysis attack according to claim 1, wherein a structure of the adaptive scan chain is controlled by a selector which receives the output value from the plaintext analysis module; when a select signal is 0, the original scan chain remains unchanged; and when the select signal is 1, the structure of the scan chain is changed.

3. The method for preventing a differential cryptanalysis attack according to claim 1, wherein the plaintext analysis module is enabled only in the test mode and stops working only when the chip is powered down.

* * * * *